(12) United States Patent
McLaughlin et al.

(10) Patent No.: US 6,263,078 B1
(45) Date of Patent: Jul. 17, 2001

(54) ACOUSTIC ECHO CANCELLER WITH FAST VOLUME CONTROL COMPENSATION

(75) Inventors: Hugh J. McLaughlin, Mountain View; Linda J. King, San Jose; Tamara L. Logan, Cupertino, all of CA (US)

(73) Assignee: SignalWorks, Inc., Mountain View, CA (US)

( * ) Notice: Subject to any disclaimer, the term of this patent is extended or adjusted under 35 U.S.C. 154(b) by 0 days.

(21) Appl. No.: 09/226,530

(22) Filed: Jan. 7, 1999

(51) Int. Cl.[7] .......................................... H04B 3/23
(52) U.S. Cl. ............................. 379/411; 379/406
(58) Field of Search ................... 379/406, 407, 379/410, 411

(56) References Cited

U.S. PATENT DOCUMENTS

| | | | |
|---|---|---|---|
| 4,912,758 | 3/1990 | Arbel | 379/388 |
| 5,400,399 | 3/1995 | Umemoto et al. | 379/388 |
| 5,467,394 | 11/1995 | Walker et al. | 379/392 |
| 5,526,426 | 6/1996 | McLaughlin | 379/411 |
| 5,610,909 | 3/1997 | Shaw | 370/291 |
| 5,631,899 | * 5/1997 | Duttweiler | 370/291 |
| 5,646,990 | * 7/1997 | Li | 379/390 |
| 5,911,124 | * 6/1999 | Doran | 455/570 |
| 5,966,438 | 10/1999 | Romesburg | 379/387 |
| 6,009,083 | * 12/1999 | Flanagan et al. | 370/287 |
| 6,160,886 | 12/2000 | Romesburg et al. | 379/410 |

* cited by examiner

Primary Examiner—Wing F. Chan
(74) Attorney, Agent, or Firm—Terry McHugh

(57) ABSTRACT

An echo canceller system and a method of filtering an outgoing signal utilize a volume compensator that operates in tandem with a primary adaptive filter to cancel echo due to a change in echo response of the system within a broadcasting environment. In particular, the volume compensator is designed to quickly adapt to a change in echo response due to an increase or decrease in the broadcast volume of a loudspeaker of the system. The echo canceller system may be incorporated into a personal computer system for a full-duplex speakerphone application. The volume compensator includes a supplementary adaptive filter that operates in parallel with the primary adaptive filter to cancel echo. The primary adaptive filter operates on the outgoing signal to cancel echo that may have been introduced into the outgoing signal along with speech of a near-end caller. The supplementary adaptive filter operates in parallel to but in conjunction with the primary adaptive filter to also cancel the echo in the original outgoing signal. Thus, each of the adaptive filters generates a filtered signal. The filtered signal having the least amount of echo is selected and transmitted to a target destination.

20 Claims, 3 Drawing Sheets

ACOUSTIC ECHO CANCELLER WITH FAST VOLUME CONTROL COMPENSATION

TECHNICAL FIELD

The invention relates generally to acoustic echo cancellers and more particularly to acoustic echo cancellers as applied to a full-duplex speakerphone device.

DESCRIPTION OF THE RELATED ART

An acoustic echo canceller is an essential component of a full-duplex speakerphone. Unlike half-duplex speakerphones, a full-duplex speakerphone allows near-end and far-end callers to talk simultaneously.

However, performance of a full-duplex speakerphone may suffer from the effects of acoustic echo paths that occur between the loudspeaker and the microphone. The problem manifests itself as audible echo and, possibly, a howlback condition as the echo is re-transmitted and re-amplified between the near-end and far-end speakerphones. Acoustic echo cancellers are designed to eliminate this problem.

With reference to FIG. 1, a prior art speakerphone system 10 having a conventional echo canceller 12 is shown. The echo canceller 12 includes an adaptive filter 14 and a subtractor 16 that are connected between a receive path 18 and an output path 20. On the receive path 18, a digital-to-analog (D/A) converter 22, an adjustable amplifier 24 and a loudspeaker 26 are connected in series. The gain provided by the adjustable amplifier 24 is controlled by an analog volume control. On the output path 20, a microphone 28, an amplifier 30, an analog-to-digital (A/D) converter 32 and the subtractor 16 are similarly connected.

When an incoming digital signal from a far-end caller is received by the system 10, the signal is transmitted through the receive path 18 for conversion by the D/A converter 22 and amplification by the adjustable amplifier 24. The amplified analog signal is then broadcast into a room by the loudspeaker 26. Depending on the acoustic characteristics of the room, echo of the broadcast signal is propagated through various echo paths from the loudspeaker 26 to the microphone 28, such as echo paths 34a and 34b. The echo may be combined with speech from the near-end caller in the microphone 28, and transmitted along the output path 20 as an outgoing analog signal. The outgoing signal is first amplified by the amplifier 30 and then converted into a digital format by the A/D converter 32.

Meanwhile, the adaptive filter 14 samples the original incoming digital signal and performs a convolution step, i.e., a computation of an estimated echo response, using the sampled signal as a reference. The estimated echo response is a predicted acoustic echo response of the system when used in a particular environment. A current estimate of the echo response is utilized to subtract echo components of the outgoing signal. The subtraction, or cancellation, of echo components is performed by the subtractor 16. After the outgoing signal has been cancelled at the subtractor, the echo-cancelled outgoing signal is transmitted to the far-end caller. In addition, the echo-cancelled outgoing signal is fed back to the adaptive filter 14 as an error signal that is utilized to dynamically adjust filter coefficients that determine echo response.

The quality of the echo cancellation depends on the ability of an adaptation algorithm, which is utilized by the adaptive filter 14, to accurately model the true echo response. The true echo response is estimated by an adaptation process in which the error signal drives the adaptation algorithm to update the coefficients of the model, so that the error signal is driven toward zero, i.e., the echo-cancelled outgoing signal does not contain any detectable echo residue. However, the acoustic response of a room does not remain constant over time. For example, positional shifts of persons and/or the microphone in the room, or opening and closing of a door change the echo paths. The change in echo paths results in a new echo response that is inaccurately represented by the previously estimated echo model. Until the echo canceller 12 can adapt to the new echo response, a substantial amount of echo may be transmitted to the far-end caller.

U.S. Pat. No. 5,610,909 to Shaw describes a communication system having an echo canceller arrangement that is intended to better compensate for changes in echo paths caused by movements of objects relative to either the microphone or the loudspeaker. The communication system of Shaw includes two echo cancellers that are connected in parallel between a receive path and an output path. An outgoing signal is initially filtered of echo by the first echo canceller. The filtered outgoing signal is then filtered by the second echo canceller. The second echo canceller is designed to adapt much quicker than the first echo canceller. This allows the first echo canceller to cancel echo from slow varying echo paths, while the second echo canceller cancels for echo from fast varying echo paths. That is, echo from different time-varying echo paths is successively removed by the first echo canceller and the second echo canceller.

Another cause for echo response change is an increase in the volume of the acoustic energy from loudspeaker 26. Often, the volume is controlled after an incoming signal has been converted from a digital signal to an analog signal, as is the case for the echo canceller system 10. As an example, in a personal computer application, a user may control the volume by manually increasing the signal gain of the signal to the loudspeakers. A sudden increase in the acoustic volume of the loudspeaker causes the magnitude of echoes within the room to change significantly. Until the echo canceller adapts to a different echo response, the sudden increase in volume causes the echo canceller to less effectively remove the echo in the outgoing signal, resulting in a significant amount of echo being transmitted to the far-end caller. The echo due to a volume increase can be quite strong. The initial echo is equal to the difference between the echo estimate and the actual echo. As an example, if the user increased the volume by a factor of four, the amount of echo transmitted to and heard by the far-end caller would be approximately three times the current echo estimate. Furthermore, the amount of time required for the echo canceller to adapt to the updated echo response can be significant. The rate of adaptation can be accelerated with an increase in adaptive filter step-size, but the probability of unstable behavior progressively increases with larger step-sizes.

While the known acoustic echo canceller systems operate well for their intended purposes, what is needed is an acoustic echo canceller system that can quickly adapt in response to sudden changes in the echo response, such as changes induced by variations in acoustic volume, without sacrificing other echo cancelling performance aspects.

SUMMARY OF THE INVENTION

An echo canceller system and a method of filtering an outgoing signal utilize a volume compensator that operates in tandem with a primary adaptive filter to cancel echo due to a change in echo response of the system. In particular, the volume compensator is designed to quickly adapt to a change in acoustic response of a room due to such factors as a sudden increase or decrease in the gain of a signal to a speaker. The echo canceller system may be incorporated into a full-duplex speakerphone or a personal computer system for a full-duplex speakerphone application.

The volume compensator includes a supplementary adaptive filter that operates in conjunction with the primary adaptive filter to cancel echo in an outgoing signal. The primary adaptive filter may be a conventional adaptive filter that utilizes one of many well known adaptive filtering techniques to cancel the echo. As an example, the primary adaptive filter may model the true echo response of the system within a particular room using a linear transfer function for cancelling the echo. The supplementary adaptive filter operates in parallel to the primary adaptive filter to also cancel the echo in the original outgoing signal. The filtered signal having the least amount of echo is selected and transmitted to a desired destination.

The supplementary adaptive filter is a single coefficient adaptive filter that models an echo response using a single coefficient function "g." The function "g" modifies an output from the primary adaptive filter to compensate for a volume change of a speaker. Preferably, the supplementary adaptive filter utilizes a time domain normalized least mean squared (NLMS) technique as applied to a single coefficient model to adapt to the change in the echo response that may have resulted from a volume change. The supplementary adaptive filter operating in conjunction with the primary adaptive filter more effectively cancels echo due to a sudden change in the speaker volume, as compared to the primary adaptive filter operating alone.

The supplementary adaptive filter is able to better cancel the echo that results from a sudden volume change, because it has a higher rate of adaptation than the primary adaptive filter. The rate of adaptation is directly related to the step-size being utilized by an adaptive filter. Larger step-sizes equate to faster rates of adaptation. The concern with a large step-size in conventional cancellers is that an increase in step-size also produces greater instability. However, the supplementary adaptive filter uses a single coefficient function and employs the NLMS technique, so that there is a high degree of simplicity and a well understood stability.

In operation, an outgoing signal is generated in a microphone of the echo canceller system. The outgoing signal may include echo of a broadcast incoming signal from a far-end caller, as well as speech from a near-end caller. The outgoing signal is transmitted to two output paths from the microphone. The primary adaptive filter samples the incoming received signal for reference to estimate the echo response. The primary adaptive filter operates to cancel echo in the outgoing signal on the first output path, using the estimated echo response to produce a first filtered signal. The filtered signal is then transmitted to a selector of the echo canceller system. The first filtered signal is also fed back to the primary adaptive filter to serve as an error signal to dynamically adjust the coefficients of the primary adaptive filter.

Meanwhile, the supplementary adaptive filter operates to cancel the echo in the outgoing signal on the second output path to produce a second filtered signal. The supplementary adaptive filter performs the filtering operation in conjunction with the primary adaptive filter to estimate the echo response. The second filtered signal is then transmitted to the selector. In addition, the second filtered signal is fed back to the supplementary adaptive filter to serve as an error signal for the second adaptive filter. Because the second adaptive filter has a greater rate of adaptation, the second adaptive filter is better able to more quickly cancel the echo than the primary adaptive filter, when the acoustic response of the room has suddenly changed.

The first and second filtered signals are then compared by the selector to determine the signal with the least amount of echo. Shortly after a sudden echo response change, the second filtered signal is most likely to contain the least amount of echo. However, after the primary adaptive filter has fully adapted, the first filtered signal may contain the least amount of echo. Therefore, the selector monitors the first and second filtered signals to select the "winning" filtered signal for transmission to the far-end caller. In the preferred embodiment, the selector computes the energy of both the first and second filtered signals. The filtered signal having the least amount of energy is declared a winner and is transmitted to the far-end caller.

An advantage of the invention is that an accelerated rate of adaptation is achieved when an echo response has changed, especially due to a change in the acoustic volume of a loudspeaker.

DETAILED DESCRIPTION

Figure 1:
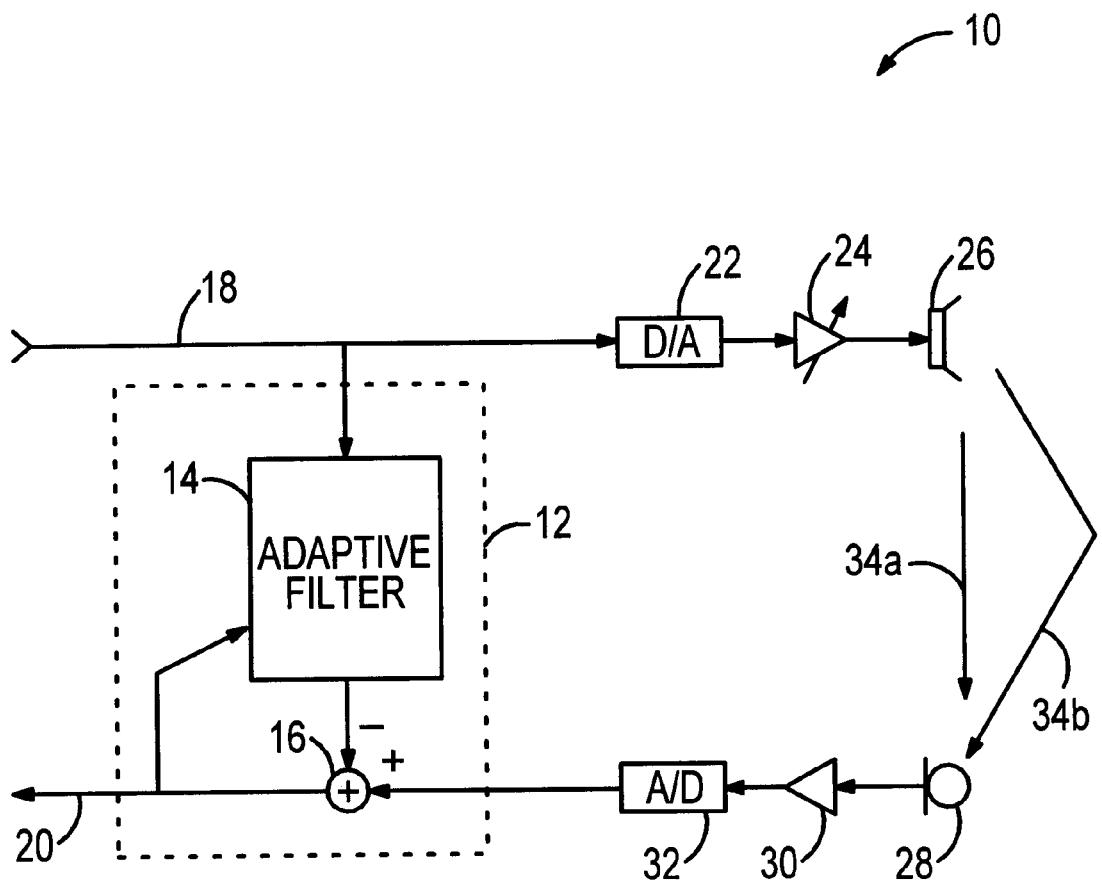
FIG. 1 is a block diagram of a speakerphone having a prior art acoustic echo canceller system.
Figure 2:
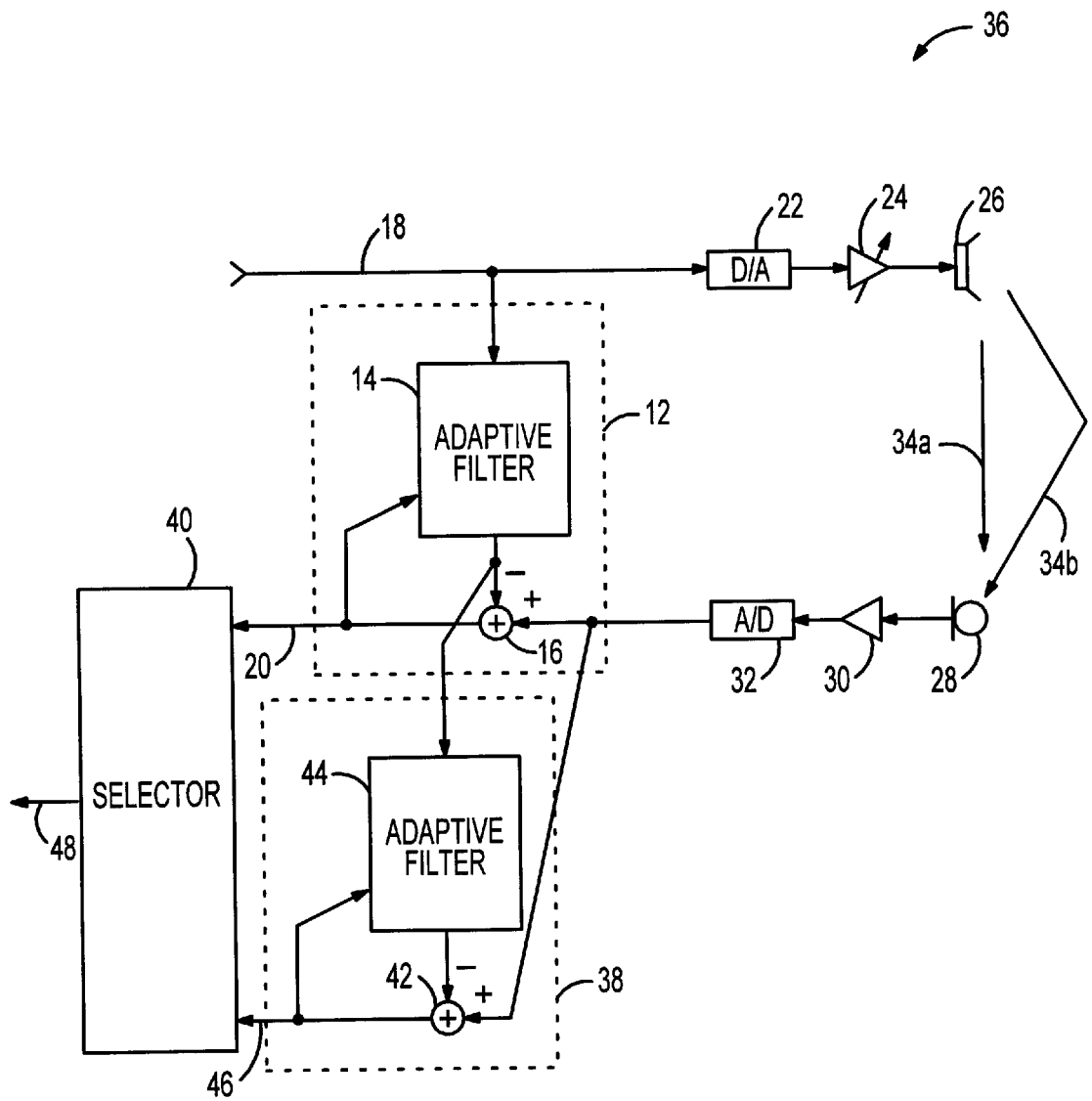
FIG. 2 is a block diagram of a speakerphone having an acoustic echo canceller system in accordance to the present invention.

With reference to FIG. 2, a speakerphone system 36 in accordance with the present invention is shown. The same reference numerals will be used for components of the system 36 that are identical to the prior art system 10 of FIG. 1. The system 36 may be incorporated into a personal computer for a full-duplex speakerphone application. The system 36 includes all the components of the system 10. However, the system 36 further includes a volume compensator 38 and a selector 40. The volume compensator 38 is comprised of a subtractor 42 and a supplementary adaptive filter 44. The subtractor 42 is located on an output path 46 that connects the A/D converter 32 to the selector 40. The adaptive filter 44 is connected to the subtractor 42 and the adaptive filter 14. The two output paths 20 and 46 lead to the selector 40. The output of selector 40 is coupled to a send path 48.

The system 36 operates to produce a first echo-cancelled signal on the output path 20 and a second echo-cancelled signal on the output path 46. The first echo-cancelled signal is a difference of the outputs of adaptive filter 14 and the A/D converter 32. On the other hand, the second echo-cancelled signal is a difference of the outputs of the supplementary adaptive filter 44 and adaptive filter 14. The echo-cancelled signal having the least amount of echo is transmitted to a far-end caller via the send path 48.

The first echo-cancelled signal is produced in a conventional manner. An incoming digital signal from a far-end caller is received by the system 36 and is transmitted through the receive path 18. The incoming signal is then converted into an analog signal and amplified by the D/A converter 22 and the adjustable amplifier 24, respectively. The amplified signal is broadcast in an audible form by the loudspeaker 26 into a room. Echo of the broadcast signal is captured along with speech from a near-end caller by the microphone 28. An outgoing signal that includes the speech and the echo is transmitted from the microphone 28 in order to be sent to the far-end caller. The outgoing signal is first amplified by the amplifier 30 and then digitized by the A/D converter 32. A portion of the outgoing signal is transmitted through the output path 20, following filtering of echo by the adaptive filter 14.

The adaptive filter 14 samples the original incoming received digital signal in blocks of data. The sampled signal is utilized as a reference signal by the adaptive filter 14 to compute an estimated echo response of the system 36 within the room. The adaptive filter 14 outputs a first predicted-echo signal using the estimated echo response. The first predicted-echo signal is input to the subtractor 16. The subtractor 16 subtracts, or cancels, the first predicted-echo signal from the outgoing signal to produce the first echo-cancelled signal along output path 20. The first echo-cancelled signal is transmitted to the selector 40 and is fed back to the adaptive filter 14 as an error signal to be utilized by the adaptive filter 14 to adapt the coefficients which define the echo response.

The second echo-cancelled signal is produced in parallel to the first echo-cancelled signal by the volume compensator 38. The supplementary adaptive filter 44 utilizes the output of the adaptive filter 14, i.e., the first predicted-echo signal, to generate a second predicted-echo signal in accordance to a modified version of the estimated echo response of the adaptive filter 44. Thus, the second predicted-echo signal is a result of the operation of both the adaptive filters 14 and 44. The subtractor 42 then subtracts the second predicted-echo signal from the outgoing signal to produce the second echo-cancelled signal along output path 46. The second echo-cancelled signal is transmitted to the selector 40 and is fed back to the adaptive filter 44 to serve as an error signal.

The volume compensator 38 is designed to quickly cancel echo in the outgoing signal due to sudden changes in the loudspeaker volume. In general, a volume change is a result of a change in gain. In fact, a volume change can be essentially defined as a change of gain on a signal to a loudspeaking element. If there is a change in volume, the model of the estimated echo response utilized by the combined operation of the adaptive filters 14 and 44 can be generally defined by the following transfer function, $$T = H^*(1+\Delta),$$

where $\Delta$ is the proportional change in the volume. The "H" represents a linear transfer function that is utilized by the adaptive filter 14 to model the echo response. The "(1+x)" is a function that can be represented by "g". The function "g" is estimated by the supplementary adaptive filter 44.

Prior to a volume change, the estimate of H is likely to have been accurate. For illustration purposes, H is assumed to exactly match the true echo response of the system 36 in the room. Using this assumption, when the echo response is static, i.e., no change in volume, the value of "g" tends to be driven to 1.0. However, when there is a sudden change in volume, the value of "g" will initially fluctuate from the value of 1.0, until the adaptive filter 14 can fully adapt to the volume change. The supplementary adaptive filter 44 operates to estimate and adapt "g" during this period of fluctuation. The equation for adapting "g" is:

$$g = g_{OLD} + \frac{\mu \sum_{i=0}^{N-1}(e_{2_i} \cdot y_i)}{\sum_{i=0}^{N-1} y_i^2}, \text{ when } \left(\sum_{i=0}^{N-1} y_i^2\right) > (MinPower \cdot N)$$

and $$g = g_{OLD} + \frac{\mu \sum_{i=0}^{N-1}(e_{2_i} \cdot y_i)}{(MinPower \cdot N)}, \text{ when } \left(\sum_{i=0}^{N-1} y_i^2\right) \leq (MinPower \cdot N),$$

where N=number of samples per block and $\mu$=step-size. This is a time domain normalized least mean squared (NLMS) technique as applied to a single coefficient model. Like other NLMS practical applications, there is an additional MinPower parameter that limits the rate of adaptation for power levels that are not meaningful.

The above adaptation equation allows for adaptation feedback having predictable stability, because it is only adapting a single coefficient. Therefore, a much larger step-size can be used for adapting "g" by the supplementary adaptive filter 44 than the step-size that would be used for adapting the coefficients of "H" by the adaptive filter 14. The larger step-size equates to a faster rate of adaptation for the supplementary adaptive filter 44. Thus, the supplementary adaptive filter 44 is able to more quickly adapt to sudden changes in the echo response due to an acoustic volume change.

After the outgoing signal has been filtered to the first and second echo-cancelled signals, the filtered signals are transmitted to the selector 40. The selector 40 computes and compares the energy for each signal. The energy may be computed by summing the squared magnitudes of each element in the signals. The signal with the least power is declared the signal to be transmitted to the far-end caller via the send path 48.

If the selection by the selector 40 is the first echo-cancelled signal, then the gain estimate "g" by the adaptive filter 44 is very likely to be invalid altogether. Therefore, the estimate of "g" is accelerated toward unity. In practice, it was found that "g" should not be immediately reset to unity because the estimate of "g" might have a degree of validity. The simplest means to accelerate the estimate to unity is to simply recompute the adaptation equation again and with a larger step-size.

Below is a pseudo-code based on the C programming language. This pseudo-code illustrates the key points in a pragmatic implementation of the invention. The bulk of the compensation technique is encapsulated in a function referred to as "CompensateVolume."

---

Pseudo-code description of Best Mode
```
/************************************************************************/
float CompensateVolume( void )
{
    float ftemp;
```

-continued

```
float npower;
float eyCor;
float eVcPower;
float tempDelta;
int eLessFlag; /* local flag */
Mu = GetAdaptationStepSize( );
/* compute power (energy) of each input vector */
YPower = = (1.0f/BLOCK_SIZE) * VSquareSum( YVec, BLOCK_SIZE );
SinPower = (1.0f/BLOCK_SIZE) * VSquareSum( SinVec, BLOCK_SIZE );
EPower = (1.0f/BLOCK_SIZE) * VSquareSum( EVec, BLOCK_SIZE );
/* apply VC gain */
VSMul( YVec, VcGain, YVcVec, BLOCK_SIZE );
/* subtract prediction from Sin actual */
VSub( SinVec, YVcVec, EVcVec, BLOCK_SIZE );
/* compute resulting power */
eVcPower = (1.0f/BLOCK_SIZE) * VSquareSum( EVcVec, BLOCK_SIZE );
/* if the adaptive filter error vector has less power
 * than the volume compensated error vector then
 * mark this condition and compute a gain delta which
 * will accelerate the gain quickly toward unity.
 */
eLessFlag = 0;
if( epower < eVcPower )
{
   tempDelta = ( 1.0f − VcGain ) * 4.0f * mu;
   eLessFlag = 1;
}
/* if productive compute the new gain */
if( ( Mu > MinMu ) || (eLessFlag == 1) )
{
   /* compute correlation term for the update */
   eyCor = (1.0f/BLOCK_SIZE) * VDotProduct( EVcVec, YVec, BLOCK_SIZE );
   npower = ypower;
   /* if the Sin power is very large more likely it is from
    * near end activity - increase the normalization power to
    * be more in line with the Sin power to decrease the effect
    * of Sin interference.
    */
   ftemp = 0.063f * spower; /* track within 12 dB of sin power */
   if( npower < ftemp )
      npower = ftemp;
   if( npower < MinPower )
      npower = MinPower;
   /* compute gain update delta */
   Delta = eyCor * mu / npower;
   /* further guard against the gain flying off due to accidental
    * correlation with interference.
    */
   ftemp = mu*VcGain;
   if( Delta > ftemp )
      Delta = ftemp;
   else if( Delta < −ftemp )
      Delta = −ftemp;
   /* now cross check against error comparison result.
    * Theory of operation: if the error power for unity
    * gain is better than the compensated result then
    * go in that direction faster than normally would be
    * computed by the gain update in the code immediately
    * above. If the normal update is actually a bigger
    * delta then just guard against overshooting the
    * unity gain
    */
   if( eLessFlag == 1 )
   {
      if( tempDelta > 0.0f ) /* if positive */
      {
         if( tempDelta > Delta )
            Delta = tempDelta;
         else
         {
            if( (VcGain + Delta) > 1.0f )
               Delta = 1.0f − VcGain;
         }
      }
      else if( tempDelta < 0.0f ) /* negative */
      {
         if( tempDelta < Delta )
            Delta = tempDelta;
         else
```

-continued

```
        {
            if( (VcGain + Delta) < 1.0f )
                Delta = 1.0f - VcGain;
        }
    }
}
/* compute new volume compensation gain */
VcGain += Delta;
/* limit gain to sensible range */
if( VcGain > MaxVcGain )
    VcGain = MaxVcGain;
if( VcGain < MinVcGain )
    VcGain = MinVcGain;
}
return eVcPower;
}
/* vector functions */
void VSMul( float *src, float scalar, float *dest, int N )
{
    int i;
    for( i=0; i<N; i++ )
    {
        *dest++ = scalar * *src++;
    }
}
void VSub( float *src1, float *src2, float *dest, int N )
{
    int i;
    for( i=0; i<N; i++ )
    {
        *dest++ = *src1++ - *src2++;
    }
}
float VSquareSum( float *src, int N )
{
    int i;
    float sum;
    sum = 0.0f;
    for( i=0; i<N; i++ )
    {
        sum += *src * *src; /* square and sum */
        src++;              /* increment source pointer */
    }
    return sum;
}
float VDotProduct( float *src1, float *src2, int N )
{
    int i;
    float sum;
    sum = 0.0f;
    for( i =0; i<N; i++ )
    {
        sum += *src1++ * *src2++;
    }
    return sum;
}
/**********************************************************************/
```

With reference to the above pseudo-code, three energy levels are initially computed based on each block of data representing the output (YVec) of the adaptive filter 14, the input from the microphone 28 (SinVec), and the error vector (EVec). The error vector EVec is the first echo-cancelled signal. The error vector EVec was presumed to be computed by subtracting the YVec from the SinVec prior to calling this function.

The next step is to apply the volume-compensated gain, i.e., the estimate of "g" function, to the Y vector. This produces a volume- compensated adaptive filter output labeled as "YvcVec," i.e., an output from the adaptive filter 44. The filter output YvcVec is subtracted from the microphone input SinVec to produce a volume-compensated error vector (EVcVec), i.e., the second echo-cancelled signal. The energy of this vector is then computed. The computed energy is compared against the energy of the error vector EVec, which has not been compensated for volume change. The error vector having the least amount of energy is declared a winner for transmission to the far-end caller.

If the volume-compensated error vector EVcVec has less energy than the error vector EVec, there exists a strong probability that the volume of the loudspeaker 26 has changed. In such an event, a flag is set in the pseudo-code to mark this condition. If the volume-compensated error vector EVcVec has more energy than the error vector EVec, a strong prob- ability exists that there has been no change in volume. Furthermore, the VcGain is probably not valid. In this condition, VcGain estimate is preferably accelerated toward unity, or "1.0." A provisional adjustment (tempDelta) is computed to adjust VcGain.

If the step-size (Mu) is large enough to be meaningful or if the error vector EVec is the current winner, then the function enters a block of code to compute an update (Delta)

to the VcGain. The step-size may likely be determined elsewhere in the speakerphone control software, based on other measurements of current activity.

In the update code block, the correlation is computed between the volume-compensated error vector EVcVec and the adaptive filter output vector YVec. The adaptation is quite similar to a single coefficient normalized least mean squared algorithm. The update is normalized by the energy of the Y vector. For pragmatic reasons, this is limited to a minimum value (MinPower) and may be adjusted based on the possibility of significant inter- ference from a near-end talker signal. The update is computed by dividing the correlated error by the normalization and multiplying by the step-size.

An instability can occur when the interfering near-end signal is strong and highly correlated with the Y vector. In such an event, the result can be unreliable. Protection against this type of instability is recommended. In the pseudo code description, the update (Delta) is limited to the step-size (Mu) to prevent such instability.

If the winning vector was the error vector Evec, a strategy is recommended to accelerate the VcGain to unity. Preferably, the adaptive filter 44 accepts either the pre-computed update (tempDelta) or the current update based on the correlation computation, whichever has the greater magnitude, i.e., the greater absolute value. A check is performed to ensure that the new VcGain will not overshoot unity gain.

Finally, the VcGain is tested against limits for maximum and minimum values. It is recommended that VcGain be limited to the worst case scenario. Very large excursions of VcGain are likely to be the result of a spurious correlation between the Sin signal and adaptive filter output Yvec.

The VcGain can vary widely, much of the time. Fortunately, the unity gain case is usually the most valid result. If the energy of non-compensated error vector EVec is less than the energy of volume-compensated error vector EVcVec, the unity gain result, i.e., the non-compensated error vector EVec is selected for transmission to the far-end caller. In general, the VcGain will vary the most when the adaptive filter output YVec is low and no valid result exists to correlate with the Sin signal. During these periods, the VcGain is not meaningful. Either the volume-compensated error vector EvcVec or the non-compensated error vector EVec may be selected for transmission to the far end. Fortunately, there is very little echo in these situations and the correct selection is not critical.

When integrated into an acoustic echo canceller system, the volume compensator 38 generally operates independently. In fact, the adaptive filter 14 needs no knowledge of the compensator's presence. During a volume change event, the compensator 38 will respond to the change by estimating the parameter VcGain. For a transient period, the compensated result will be selected. In the mean time, the adaptive filter 14 should be still allowed to adapt. Eventually, the adaptive filter 14 will catch up with the compensator 38. At such time, the error signal EVec will usually win the decision for the best vector for transmission to the far-end caller.

It should be readily apparent to practitioners in the art that there are peripheral benefits to this compensator scheme. For example, the compensator 38 produces an estimate of the change in the coupling between the loudspeaker 26 and the microphone 28.

Figure 3:
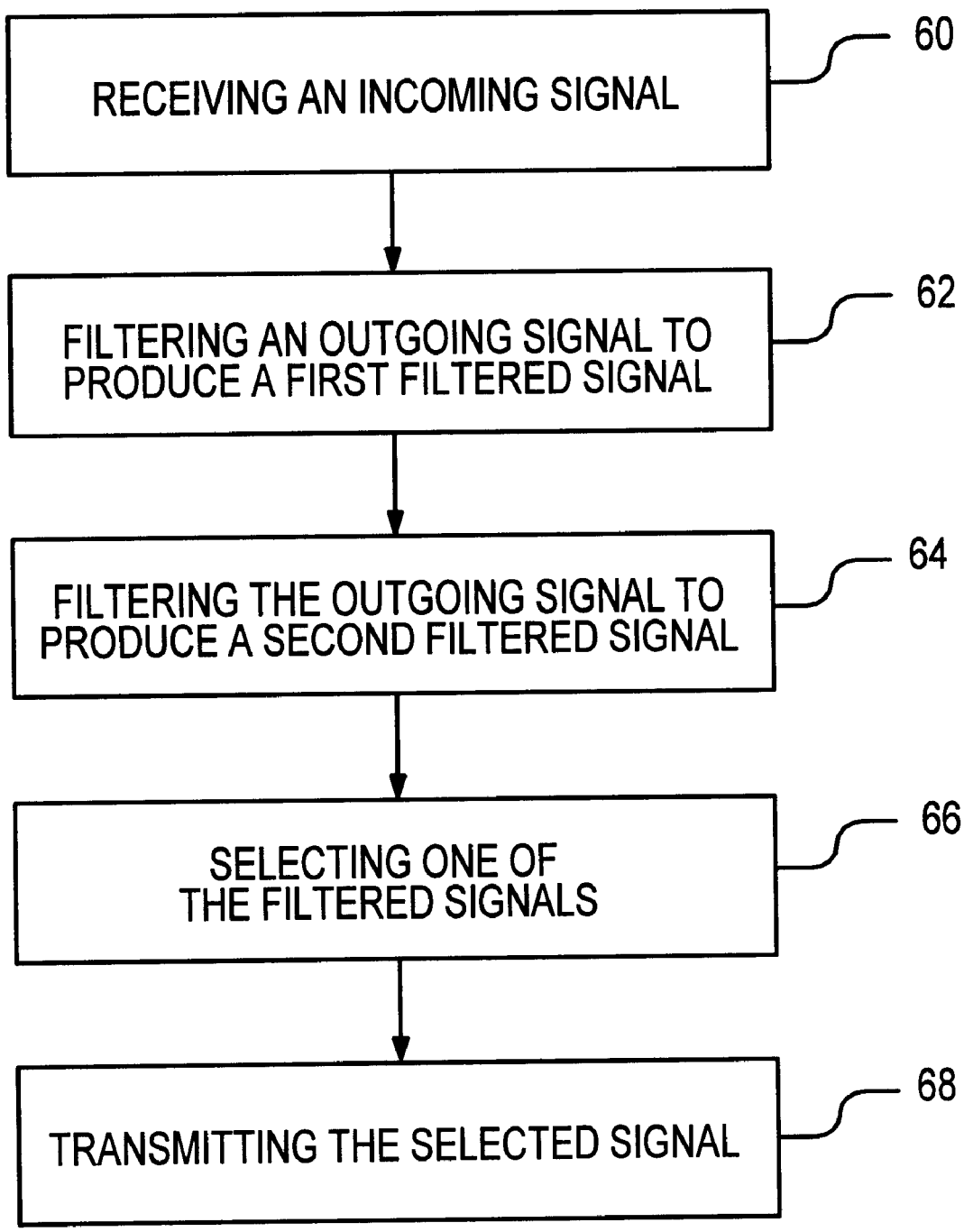
FIG. 3 is a flow diagram of a method of filtering an outgoing signal in accordance to the present invention.

A method of filtering an outgoing signal of undesired in accordance with the present invention will be described with reference to FIG. 3. At step 60, an incoming signal from a far-end caller is received by the echo canceller system. The incoming signal is initially in a digital format. The incoming signal is converted into an analog signal and amplified by the system. The digitized and amplified signal is then broadcast into a room by a loudspeaker. Echo of the broadcast signal is captured by a microphone of the system along with speech from a near-end caller. An analog outgoing signal, including the speech and the echo, is amplified and digitized by the system. At step 62, the digitized outgoing signal is filtered of the echo by a first adaptive filter. The first adaptive filter utilizes a sampled incoming signal as a reference to cancel the echo in the outgoing signal. The filtering step 62 converts the outgoing signal into a first filtered signal. Next, at step 64, the same digitized outgoing signal is filtered of the echo by a second adaptive filter. The second adaptive filter operates in conjunction with the first adaptive filter to cancel the echo in the outgoing signal. Preferably, the second adaptive filter has a greater rate of adaptation than the first adaptive filter, allowing the second adaptive filter to cancel the echo due to a change in volume of the loudspeaker. The filtering step 64 converts the outgoing signal into a second filtered signal.

At step 66, one of the filtered signals is selected for transmission to the far-end caller. The selection process includes comparing a noise-dependent characteristic of the filtered signals. Preferably, the noise- dependent characteristic is the energy of the filtered signals, which can be computed and compared to determine the filtered signal to be transmitted. The selected signal should have the least amount of echo. Next, at step 68, the selected signal is transmitted to the far-end caller.

Although the echo canceller system 36 has been described as having a single volume compensator, additional compensators may be incorporated into the system. The number of additional compensators is not critical. Each compensator would include an adaptive filter that operates in conjunction with the adaptive filter 14 to filter the original outgoing signal. Preferably, each adaptive filter of a compensator utilizes a different step-size. In this modified embodiment, the selector 40 selects from a number of echo-cancelled signals that corresponds to the number of compensators employed. The echo-cancelled signal having the least amount of echo is selected for transmission.

What is claimed is:

1. An echo canceller system comprising:
   a receive path to receive an incoming signal;
   send means for enabling transmissions that are responsive to an outgoing signal from a source, said send means having a first output line and a second output line for enabling alternative connections between said source and an output terminal of said send means;
   first echo-cancelling means coupled to said first output line for generating a first predicted-echo signal that is removed from said outgoing signal for filtering echo in said outgoing signal to produce a first echo-cancelled signal on said first output line, said first echo-cancelling means being responsive to said first echo-cancelled signal as a first error signal and being responsive to said incoming signal as a reference signal for computing said echo in said outgoing signal;
   second echo-cancelling means coupled to said second output line for generating a second predicted-echo signal that is removed from said outgoing signal for filtering said echo in said outgoing signal to produce a second echo-cancelled signal on said second output line, said first and second echo-cancelling means being configured such that said filtering of said outgoing signal along said second output line by said second echo-cancelling means bypasses said filtering of said outgoing signal along said first output line by said first echo-cancelling means, said second echo-cancelling means being responsive to said second echo-cancelled signal as a second error signal and being directly responsive to said first predicted-echo signal as a second reference signal for computing said echo in said outgoing signal; and selecting means configured to receive said first echo-cancelled signal and said second echo-cancelled signal for selectively transmitting one of said first echo-cancelled signal and said second echo-cancelled signal via said output terminal.

2. The system of claim 1 wherein said first echo-cancellinq means includes a first adaptive filter having a first rate of adaptation with respect to filtering said echo in said outgoing signal, said second echo-cancelling means having a second adaptive filter having a second rate of adaptation with respect to filtering said echo in said outgoing signal, said second rate of adaptation being greater than said first rate of adaptation.

3. The system of claim 2 wherein said second adaptive filter is a single coefficient adaptive filter.

4. The system of claim 3 wherein said single coefficient adaptive filter is configured to adapt to changes in said echo in said outgoing signal, said changes in said echo being at least partly due to a change in a broadcast volume of said incoming signal.

5. The system of claim 3 wherein said single coefficient adaptive filter is configured to utilize a time domain normalized least mean squared (NLMS) technique to filter said echo in said outgoing signal.

6. The system of claim 2 wherein said first adaptive filter is configured to produce said first echo-cancelled signal using a linear transfer function.

7. The system of claim 1 wherein said second echo-cancelling means is one of a plurality of compensators, each compensator including an associated adaptive filter that is operatively coupled to receive an output of said first echo-cancelling means to filter said echo in said outgoing signal, said associated adaptive filter utilizing a particular step-size to effectuate said filtering.

8. The system of claim 7 wherein said particular step-size is different for each associated adaptive filter of said compensators.

9. The system of claim 1 wherein said selecting means is configured to compute and compare an energy level of said first echo-cancelled signal to an energy level of said second echo-cancelled signal for said selective transmission.

10. The system of claim 1 further comprising a loudspeaker located at an end of said receive path to broadcast said incoming signal in an audible form and a microphone positioned to form said outgoing signal in response to sound.

11. A method of filtering a signal to cancel echo comprising steps of:

receiving an incoming signal from a remote source;

filtering an unfiltered outgoing signal along a first path to cancel said echo using a first adaptive filter to generate a first prediction of an echo component included in said unfiltered outgoing signal, said first prediction being used to produce a first echo-filtered signal, including sampling said incoming signal for reference in predicting said echo component within said unfiltered outgoing signal and including utilizing a first error signal that is responsive to said first echo-filtered signal;

filtering said unfiltered outgoing signal along a second path to cancel said echo using a second adaptive filter in conjunction with said first adaptive filter to generate a second prediction of said echo component within said unfiltered outgoing signal, said second prediction being used to produce a second echo-filtered signal, including utilizing a second error signal that is responsive to said second echo-filtered signal, said second path being separate from said first path; and selecting one of said first echo-filtered signal and said second echo-filtered signal for transmission, including comparing an echo-dependent characteristic of said first and second echo-filtered signals, said echo-dependent characteristic being a criterion for said selection.

12. The method of claim 11 wherein said second step of filtering said unfiltered outgoing signal includes utilizing a single coefficient model to estimate said echo from a broadcasting environment, said second step of filtering further including sampling a first-prediction signal from said first adaptive filter as a reference signal, said first-prediction signal being directly related to said first prediction of said echo component.

13. The method of claim 12 wherein said second step of filtering said unfiltered outgoing signal further includes employing a time domain normalized least mean squared (NLMS) technique to adapt to said estimated echo.

14. The method of claim 12 wherein said first step of filtering said unfiltered outgoing signal includes utilizing a linear transfer function to create a multi-coefficient model to estimate said echo from said broadcasting environment.

15. The method of claim 14 wherein said first step of filtering said unfiltered outgoing signal includes adapting to said multi-coefficient model using a first step-size and said second step of filtering said unfiltered outgoing signal includes adapting to said single coefficient model using a second step-size, said second step-size being larger than said first step-size.

16. The method of claim 11 wherein said step of comparing said echo-dependent characteristic includes comparing the energy levels of said first filtered signal and said second filtered signal.

17. An echo canceller system comprising:

an input line to receive an incoming signal;

an output line to transmit an outgoing signal;

a first adaptive filter coupled to said input line to sample said incoming signal as a reference signal and coupled to said output line for cancelling echo in an outgoing signal on said output line to produce a first filtered signal, said first adaptive filter configured to generate a primary estimated echo signal that is used to cancel said echo in said outgoing signal;

a second adaptive filter connected to receive said primary estimated echo signal as a reference signal and connected to said output line for canceling said echo in said outgoing signal in parallel to said first adaptive filter to produce a second filtered signal, said second adaptive filter configured to generate a secondary estimated echo signal that is used to cancel said echo in said outgoing signal, said secondary estimated echo signal being responsive to said primary estimated echo signal, said first and second adaptive filters having separate error signals for determining said primary and secondary estimated echo signals; and comparing means operatively associated with said first adaptive filter and said second adaptive filter for selecting one of said first filtered signal and said second filtered signal for transmission via an output line.

18. The system of claim 17 wherein said first adaptive filter has a first rate of adaptation and said second adaptive filter is a single coefficient adaptive filter having a second rate of adaptation, said second rate of adaptation being greater than said first rate of adaptation.

19. The system of claim 18 wherein said single coefficient adaptive filter is configured to employ a time domain normalized least mean squared (NLMS) technique to adapt to a model of an echo of a broadcasting environment.

20. The system of claim 17 wherein said comparing means is configured to compute and compare the energies of said first filtered signal and said second filtered signal, said computed energy being a selective factor utilized by said comparing means.

* * * * *